US008000843B2

(12) United States Patent
Kim

(10) Patent No.: US 8,000,843 B2
(45) Date of Patent: Aug. 16, 2011

(54) CRITICAL EVENT REPORTING

(75) Inventor: Frederick Duke Kim, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 12/757,459

(22) Filed: Apr. 9, 2010

(65) Prior Publication Data

US 2010/0191412 A1 Jul. 29, 2010

Related U.S. Application Data

(63) Continuation of application No. 11/521,841, filed on Sep. 14, 2006, now Pat. No. 7,725,216.

(51) Int. Cl.
*G06F 7/00* (2006.01)

(52) U.S. Cl. .......................................................... 701/1

(58) Field of Classification Search .............. 701/1, 200, 701/211

See application file for complete search history.

(56) References Cited

U.S. PATENT DOCUMENTS 5,948,040 A * 9/1999 DeLorme et al. ............. 701/201
6,070,123 A 5/2000 Beyer et al.
6,282,490 B1 8/2001 Nimura et al.
6,356,836 B1 * 3/2002 Adolph ......................... 701/208
7,725,216 B2 * 5/2010 Kim ................................ 701/1

FOREIGN PATENT DOCUMENTS

DE 102004034060 2/2006
WO 0022595 4/2000

OTHER PUBLICATIONS

International Search Report, PCT/US07/078554, International Search Authority—European Patent Office. May 9, 2008.
Written Opinion, PCT/US07/078554, International Search Authority—European Patent Office. May 9, 2008.

* cited by examiner

*Primary Examiner* — Yonel Beaulieu
(74) *Attorney, Agent, or Firm* — Ashish L. Patel; Gerald P. Joyce, III

(57) ABSTRACT

A fleet management system for remotely monitoring a vehicle is disclosed in one embodiment. The fleet management system includes a data receiver and a display. The data receiver is configured to wirelessly receive information from the vehicle. That information includes a location for the vehicle. The display is configured to present a planned route configured for the vehicle before travel and a driven route of the vehicle. The driven route is determined from the information from the vehicle. The planned route and driven route are displayed simultaneously.

20 Claims, 9 Drawing Sheets

CRITICAL EVENT REPORTING

CLAIM OF PRIORITY UNDER 35 U.S.C. §120

The present Application for Patent is a Continuation Application, and claims priority to patent application Ser. No. 11/521,841 entitled "Critical Event Reporting" filed Sep. 14, 2006, now U.S. Pat. No. 7,725,216 and assigned to the assignee hereof and hereby expressly incorporated by reference herein.

BACKGROUND

This disclosure relates in general to fleet management systems and, more specifically to event reporting for a member of the fleet amongst other things.

Fleet management systems allow gathering information on members of the fleet. For example, the location of fleet members can be determined by information sent to a network management center. A map showing location readings over time can be produced to show travel of a truck or trailer.

There are systems that feature video capture, for example, for law enforcement purposes. In one management system, a video camera senses an unusual event with an accelerometer. A segment of video is captured upon the unusual event. That video segment can be uploaded wirelessly when in contact with a WiFi network.

Accident reports are manually generated. A law enforcement official fills out a report documenting evidence that can be discerned at the accident location. Often the information gathered at the scene is out of date by the time the report is generated. Some autos may gather information on the car computer such as speed, engine status, etc. that can be downloaded from the computer using a wired diagnostic tool.

SUMMARY

In one embodiment, the present disclosure provides a management system for remotely monitoring a vehicle. The fleet management system includes a data receiver and a display. The data receiver is configured to wirelessly receive information from the vehicle. That information includes a location for the vehicle. The display is configured to present a planned route configured for the vehicle before travel and a driven route of the vehicle. The driven route is determined from the information from the vehicle. The planned route and driven route are displayed simultaneously.

In another embodiment, the present disclosure provides a method for monitoring a vehicle remotely. In one step, information is wirelessly received from the vehicle, which is remotely located. The information comprises a location for the vehicle. A planned route configured for the vehicle before travel is presented along with a driven route of the vehicle. The driven route is determined from the information from the vehicle. The planned route and driven route are displayed simultaneously.

In yet another embodiment, the present disclosure provides a vehicle management apparatus for monitoring a vehicle. The management apparatus includes a data receiver and a display. The data receiver is configured to receive information from the vehicle, which is remotely located. The information comprises a location for the vehicle. The display is configured to present hours of service for a driver of the vehicle, a planned route configured for the vehicle before travel, and a driven route of the vehicle. The driven route is determined from the information from the vehicle. The planned route and driven route are displayed simultaneously.

In still another embodiment, the present disclosure provides a vehicle management apparatus for monitoring a vehicle or movable body remotely. The vehicle management apparatus includes means for receiving information from the vehicle and means for presenting configured to simultaneously display a planned route and a driven route. The information is received wirelessly by the means for receiving, and the information comprises a location for the vehicle. The planned route is determined for the vehicle before travel of the driven route, and the driven route is determined from the information from the vehicle.

In yet another embodiment, the present disclosure provides a machine-readable medium having machine-executable instructions configured to monitor a vehicle remotely. The machine-readable medium comprising machine-executable instructions for: wirelessly receiving information from the vehicle, presenting a planned route configured for the vehicle before travel, and presenting a driven route of the vehicle. The information comprises a location for the vehicle, which is remotely located. The driven route is determined from the information from the vehicle, and the planned route and driven route are displayed simultaneously.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment (s) will provide those skilled in the art with an enabling description for implementing a preferred exemplary embodiment. It being understood that various changes may be made in the function and arrangement of elements without departing from the spirit and scope as set forth in the appended claims.

Figure 1A:
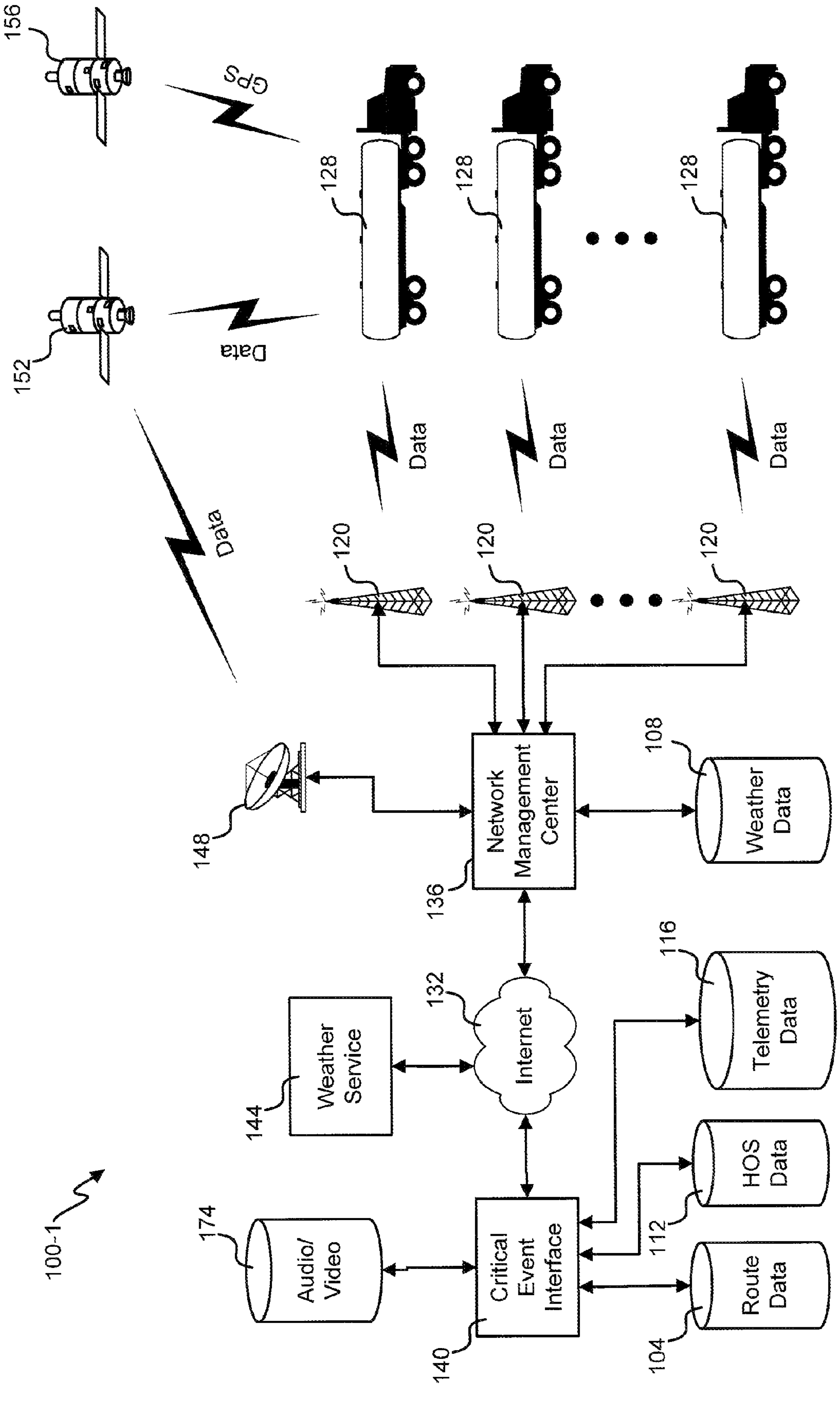
FIGS. 1A and 1B depict block diagrams of an embodiment of a fleet management system.

Referring initially to FIG. 1A, a block diagram of an embodiment of a fleet management system 100-1 is shown. The fleet includes trucks and/or trailers 128 that are outfitted with a vehicle management system. In other embodiments, any movable machine or body could be configured with a vehicle management system. For example, the movable body could be a plane, boat, package, bicycle, person, etc. Each vehicle management system determines geographic location by using satellites 156 (e.g., GLONASS, GPS, Galileo) and/or terrestrial techniques.

Information gathered by the vehicle management system is relayed by a satellite 152 and/or base station 120 to a network management center 136. For a satellite link, the vehicle management system uses a modem to communicate with a satellite 152, which relays the communication with a satellite dish 148 at a ground station. The base station 120 could couple to a wireless modem of the vehicle management system using any number of wireless data methods (e.g., GSM, CDMA, TDMA, WCDMA, EDGE, OFDM, GPRS, EV-DO, WiFi, Bluetooth, WiMAX, UWB, PAN, etc.). In this embodiment, frequent lower-bandwidth information is sent by the satellite link, and infrequent higher-bandwidth information is sent with the base station 120 using a wireless terrestrial data network. Other embodiments could divide the information differently or use one or the other datalink exclusively.

The information gathered from the fleet of vehicles 128 is aggregated at one or more network management centers 136. Certain processing can be performed at the network management center 136 before relaying information via a network 132 (e.g., VPN, WAN, Internet) with various end users. This embodiment can query a weather service 144 when a critical event is reported. The weather data returned from the query is stored in a weather database 108 that is accessible to end users. With this query, a weather service (e.g., National Oceanic and Atmospheric Administration in the United States) can return localized weather information according to the particular vehicle's location. That weather information is available for a certain amount of time before the critical event and a certain amount of time afterward, both of these times can be programmable.

A critical event (CE) interface 140 is available to the end user to monitor critical events for vehicles 128 in the fleet. As further explained below, the CE interface 140 can display driven route, planned route, HOS information and telemetry information. The CE interface 140 could include any type of computing system (e.g., PDA, cellular phone, laptop computer, desktop computer, web appliance, tablet computer) that can be coupled to a network and display an interface. Using the CE interface 140, the end user can access a planned route for a vehicle 128 that is stored in a route database 104. The planned route is configured before the driver of the vehicle travels the route and is displayed in contrast to a driven route that the vehicle actually took by the CE interface 140.

Gathered from the network management center 136 are the driven route of each vehicle, along with hours of service (HOS) information 112, audio and/or video, and telemetry data 116. The hours logged by driver of the vehicle 128 and the movement of the vehicle 128 are stored in the HOS database 112 and are used to determine HOS. Regulatory HOS rules require that drivers only work a certain amount under certain conditions. The network management center 136 and/or CE interface 140 can analyze this information to indicate how close a driver is to exceeding the HOS limits.

Telemetry information is reported from the vehicle 128 and stored in the telemetry database 116. Any number of things can be gathered from the fleet by the vehicle management systems, for example, engine status (e.g., engine temperature, RPM, smog control equipment), brake status, the state of various lights (e.g., brake light, turn signal, headlamp, high-beam headlamp, interior cabin light), transmission status and gear, speed, rate of acceleration, error codes, cabin temperature, outside temperature, wiper blade activation, compass heading, anti-lock brake status, air bag status, steering wheel movement, seat-occupied sensors, tire pressure, trailer status (e.g., temperature, tire pressure, generator state, hitch status), and anything else that can be electronically monitored. This each piece of this information can be selectively reported at a programmable interval or when certain conditions exist, for example, a critical event. Additionally, the vehicle management system can program and/or activate gathering of the telemetry information remotely according to any criteria or algorithm.

The audio and/or video database 174 stores any audio or video clips captured at the vehicle 128 and sent to the base station 120, in this embodiment. Often, the base station 120 may not be in range and the vehicle management system stores the video/audio clips until such a connection is possible. The CE interface 140 will assemble that information with other received information as it becomes available.

Figure 1B:
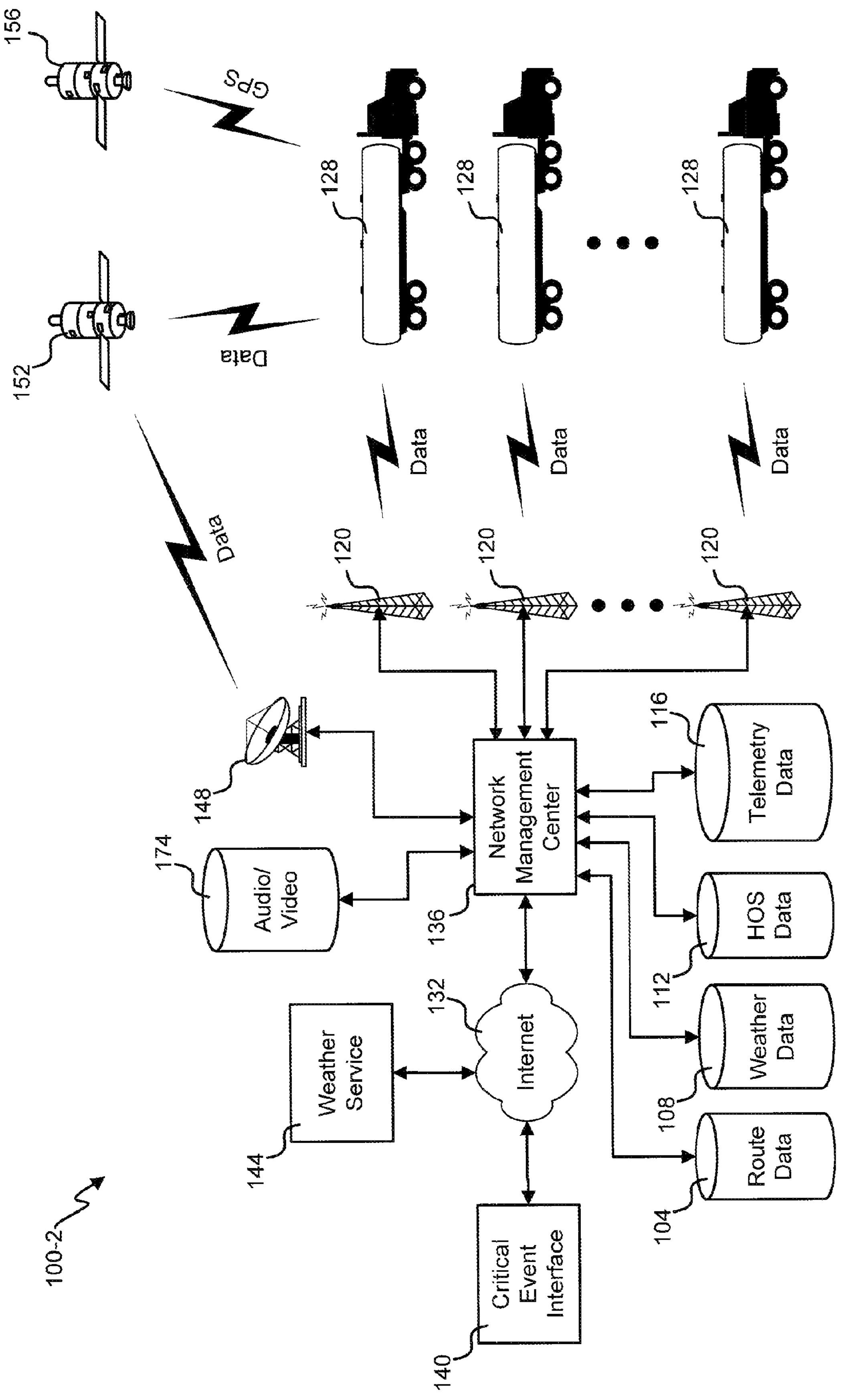

With reference to FIG. 1B, a block diagram of another embodiment of the fleet management system 100-2 is shown. In this embodiment, the CE interface 140 interacts as the network management center 136 who is an application service provider. The CE interface 140 could use any web browsing software or apparatus. The route database 104, weather database 108, HOS database 112, telemetry database 116, audio/video database are all maintained by the network management system 136. Through the Internet 132, the CE interface 140 can access information and configure management.

Figure 2A:
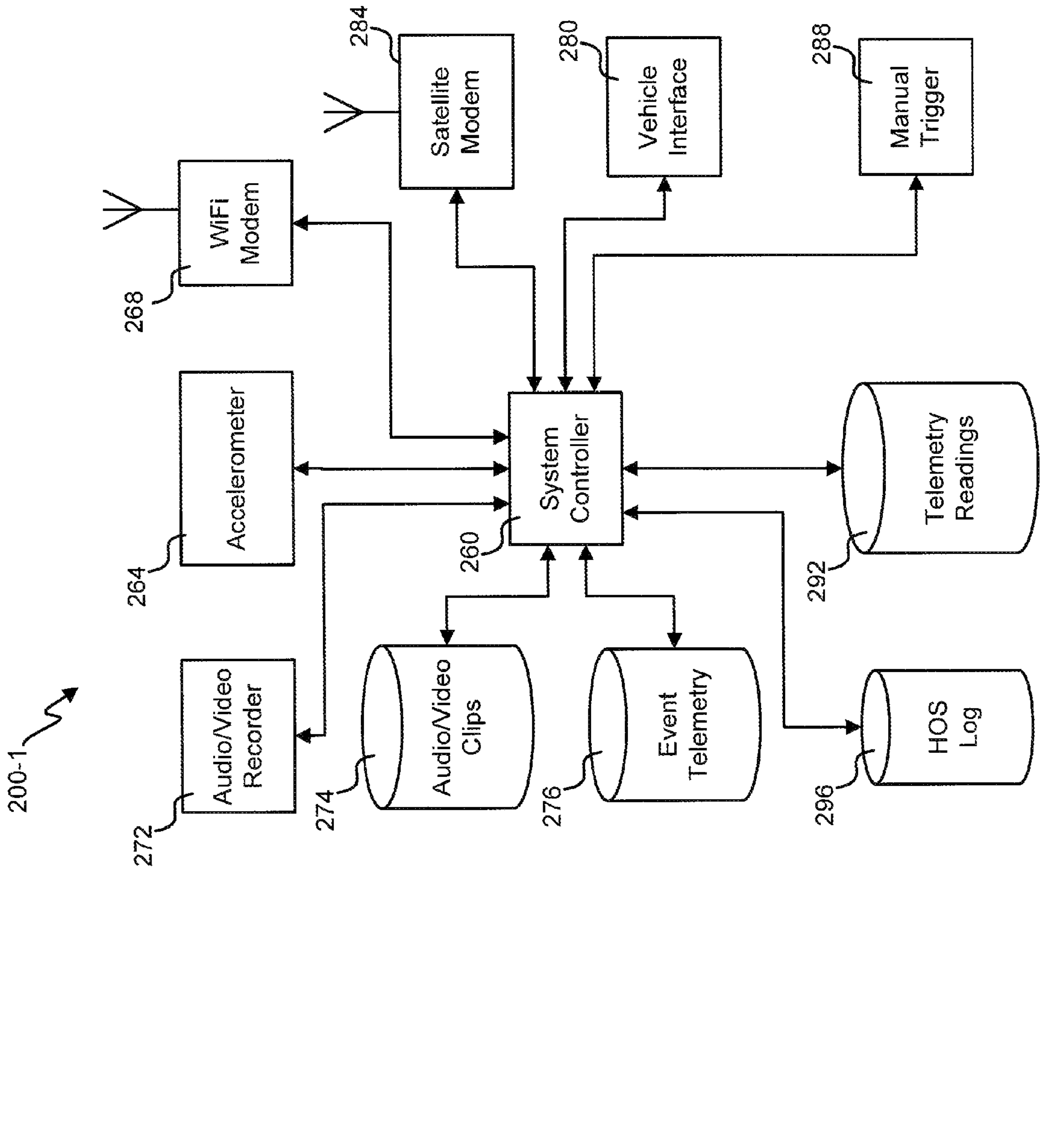
FIGS. 2A and 2B depict block diagrams of embodiments of a vehicle management system.

Referring to FIG. 2A, a block diagram of an embodiment of a vehicle management system 200-1 is shown. The vehicle management system 200-1 could be mounted in the vehicle 128, a trailer or any other movable body. In some embodiments, the vehicle management system 200-1 is a portable or handheld unit. This movable vehicle management system could wirelessly receive telemetry from the movable body 128 using Bluetooth, wireless USB, UWB, or PAN.

This embodiment can communicate with a terrestrial modem, for example, a WiFi modem 268 along with a satellite modem 284. Various information sent from the vehicle management system 200-1 can be divided between these modems according to some scheme, such as criticality of the information, size of the information or other factors.

A system controller 260 manages operation of the system 200. A terminal, tablet, laptop, or other computer could be used as the vehicle management system 200, and the system controller 260 could include a processor and/or software application. A vehicle interface to the vehicle computer and other systems allow the system controller to gather various telemetry information of the types described above. When a critical event occurs, information for the prior five minutes and the following two minutes is saved, but other buffer times could be programmed by the end user.

There are several ways to trigger a critical event. This embodiment has a manual trigger 288 that could be a hard or soft switch that the driver can activate to preserve a record of the state of operation. Another way to trigger the critical event situation is automatically by some sensor(s) and/or algorithm. In this embodiment, automatic triggering can happen in several ways, for example, a hard brake (e.g., deceleration greater than nine mph/sec), excessive brake pressure, abnormal speed, or abnormal acceleration that could signal an impact. The accelerometer 264 is used to measure acceleration in this embodiment. Further some embodiments could receive a remote trigger from the CE interface 140 or network management center 136, for example, when the driven route varies in some defined way from the planned route.

An audio and/or video recorder(s) 272 can record within the cabin and/or outside the vehicle. Some embodiments could have a number of audio and/or video recorders. Some or all of these recordings could be stored when there is a critical event. An audio/video clip database 274 is used to store a buffer of each recording. Upon activation of a critical event trigger, a set amount of the past buffer and future recording is preserved. The preserved recordings can be saved for wired or wireless download to the network management center 136.

Other databases store telemetry readings 292, a HOS log 296 and route information 276. These databases may store any programmable amount of information. When a trigger occurs, a predetermined amount of information is stored and sent by the satellite and/or WiFi modem 284, 268. Some of this information is reported regardless of a critical event situation. For example, driven route locations are determined on some interval and reported to the network management center to allow vehicle tracking Other information could be tagged for periodic upload.

Figure 2B:
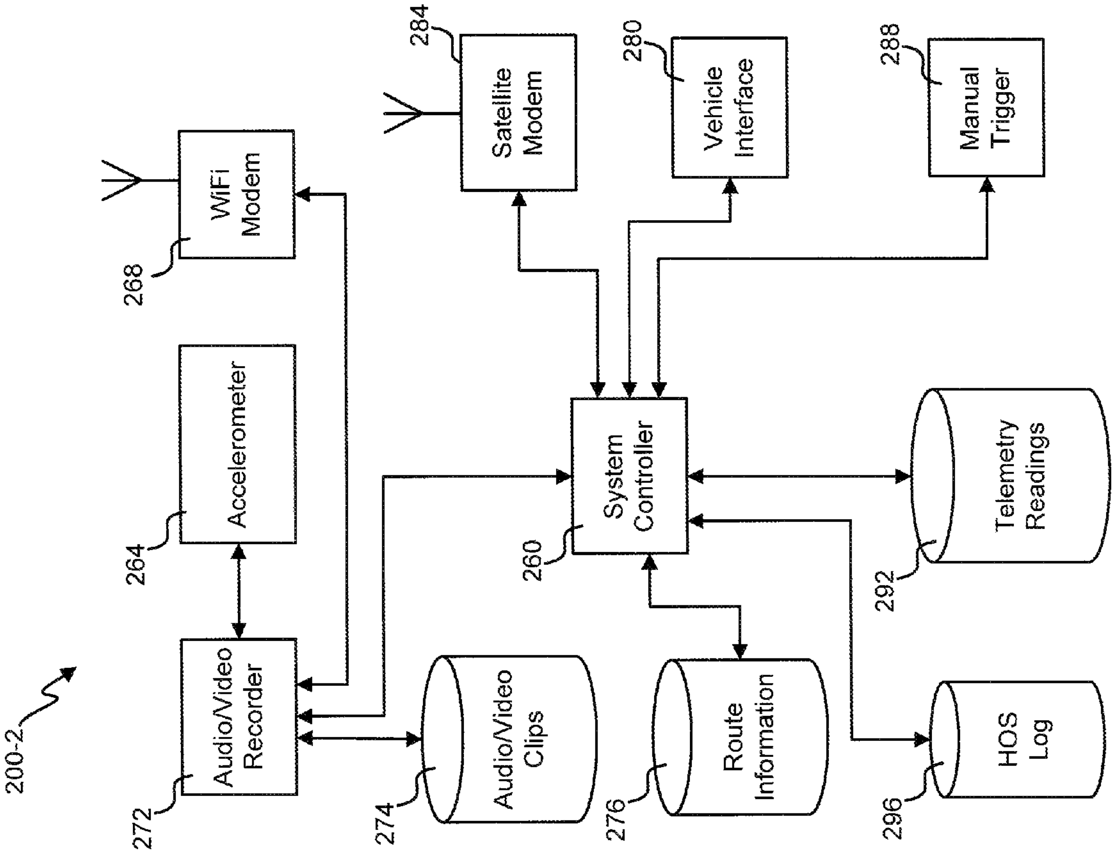

With reference to FIG. 2B, a block diagram of another embodiment of the vehicle management system 200-2 is shown. This embodiment has a subsystem that is used for audio/video recording. The audio/video recorder 272 can be triggered by an accelerometer 264 or the system controller to keep audio and/or video clips. Those clips are sent to the system controller to forward over the satellite modem 284 or can be sent with the WiFi modem 268 should it be in range of a base station 120. Although embodiments only store audio and/or video, other embodiments could store still images for upload.

Figure 3A:
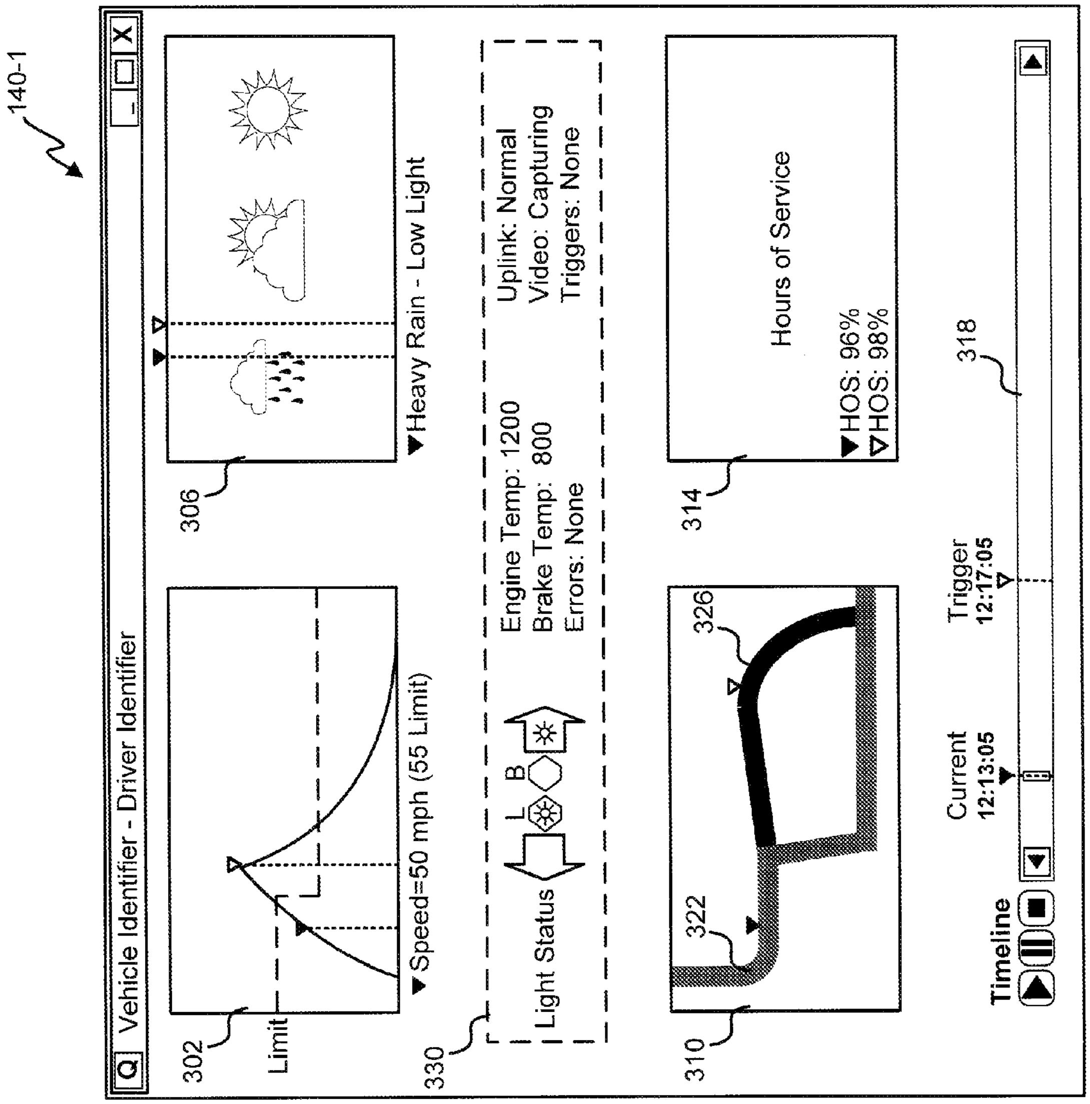
FIGS. 3A and 3B depict diagrams of embodiments of a critical event interface.

Referring next to FIG. 3A, a diagram of an embodiment of a CE interface 140-1 is shown. This screen of information could be from an application or web browser. The interface could be rearranged and the information customized, but this embodiment allows observation of several items to aid an end user analyzing a critical event. A particular vehicle identifier and driver identifier is shown for the CE interface 140-1. Through configuration, some or all of the information can be shown on one or more pages of the interface.

This embodiment includes several areas that are displayed. All the information shown in the interface has a temporal aspect to it. A timeline control displays the available time frame for the information available to the CE interface 140. The event trigger is shown on the timeline at 12:17:05, while the current time of the displayed information is shown as 12:13:05. Dragging the current time control through the timeline allows quick access of any other portion of the information. Playback controls for the timeline allow playing sequentially through the stored information, stopping or pausing playback. Through the other portions of the CE interface 140, a solid triangular pointer is used to show the current time and a triangular pointer with no fill indicates the location of the trigger.

A speed graph 302 shows the vehicle speed over time along with the speed limit on the driven route over time. For example, a change in the speed limit is shown after the current time, but before the trigger event. Other graphs could show any telemetry information over time. The end user can configure which items appear on the graph such that trends can be found relative to the event trigger.

A weather chart 306 shows the weather conditions at the vehicle as a function of time. The current time cursor can be moved throughout the weather chart 306 and the weather information is displayed below the weather chart 306. The weather conditions are received from one or more sources and can be augmented by satellite, radar, local reports, and any other information that might help characterize the conditions.

This embodiment includes a telemetry status 330 portion of the display. The end user can configure the telemetry status 330 to show any number of things reported from the vehicle 128. The light status shows which lights are currently active, for example, left turn signal, headlights, brake lights, or right turn signal. Other telemetry such as engine temperature, brake temperature, vehicle computer errors, status of modem (s), video capture status, and any trigger conditions.

Routing information 310 is shown in another portion or window of the display. This embodiment shows the planned route 322 chosen before the vehicle traveled the route in shading. Deviations from the planned route 322, are shown in solid as the driven route 326. Other embodiments show the complete driven route 326 and not just when it deviates from the planned route 322 like the current embodiment. This embodiment smoothes the received location readings and fits them to known streets, but other embodiments could show each individual location reading in an unfiltered manner. The routing information could be displayed on a map and/or a satellite image.

In this embodiment, a HOS application takes log information for the driver and time/travel information to track HOS. The logs and travel times could be displayed in the HOS area 314 along with a current time HOS percentage and triggered time HOS percentage, for example, at the time of the trigger, the HOS for the driver could be 98% of what is allowed by law. Additionally, the HOS for the current time is shown.

Figure 3B:
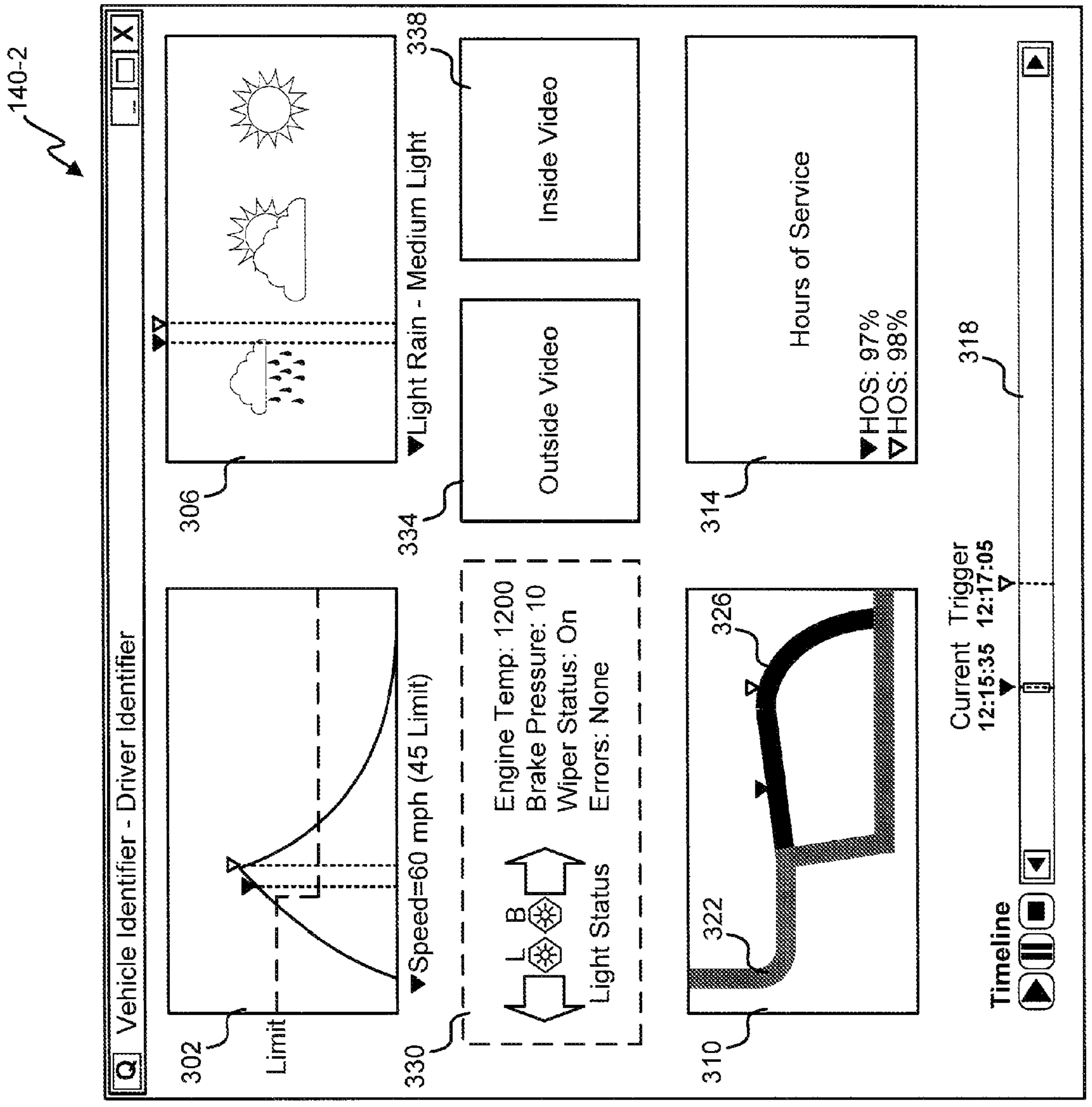

With reference to FIG. 3B, a diagram of another embodiment of the critical event interface 140-2 is shown. This embodiment shows a current time closer to the trigger. The speed of the vehicle is increased, the rain is tapering, the telemetry is changed, and the driver has chosen a driven route that deviates from the planned route. The telemetry in this view has been changed to display brake pressure and wiper blade activity, while some other telemetry is not displayed. Additionally, outside video 334 showing the scene around the vehicle 128 is now available along with inside video 338 showing the driver and/or cabin. The video may have been recently received or unrecorded at other times in the timeline.

Figure 4:
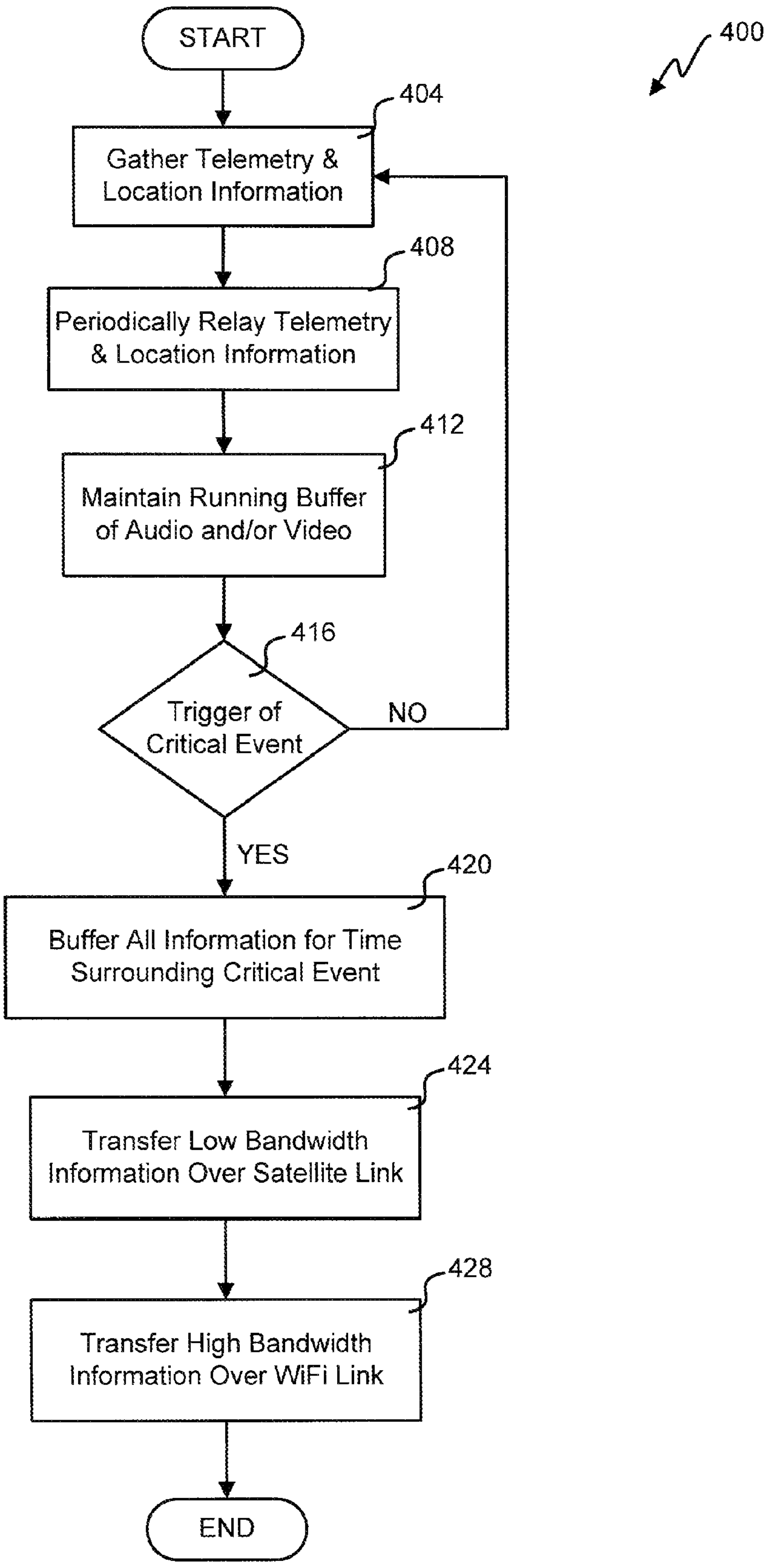
FIG. 4 illustrates a flowchart of an embodiment of a process for producing critical event information.

Referring next to FIG. 4, a flowchart of an embodiment of a process 400 for producing critical event information is shown. The depicted portion of the process begins in block 404 where telemetry and location information is gathered at the vehicle 128 with the vehicle management system 200. The telemetry and location information is periodically sent from the vehicle management system 200 to the network management center 136 in block 408. The frequency of the reports can be programmed along with what is reported.

In block 412 and in an ongoing basis, the audio and/or video is maintained in a running buffer. Block 416 determines if a critical event is triggered. Where there is no critical event, processing loops back to block 404. Alternatively, should there be a trigger of a critical event as determined in block 416, processing continues to block 420 where all or selected information is stored for a period surrounding the critical event. The low-bandwidth information is transferred over the satellite link in block 424 and the high-bandwidth information is transferred over a WiFi link in block 428.

Figure 5:
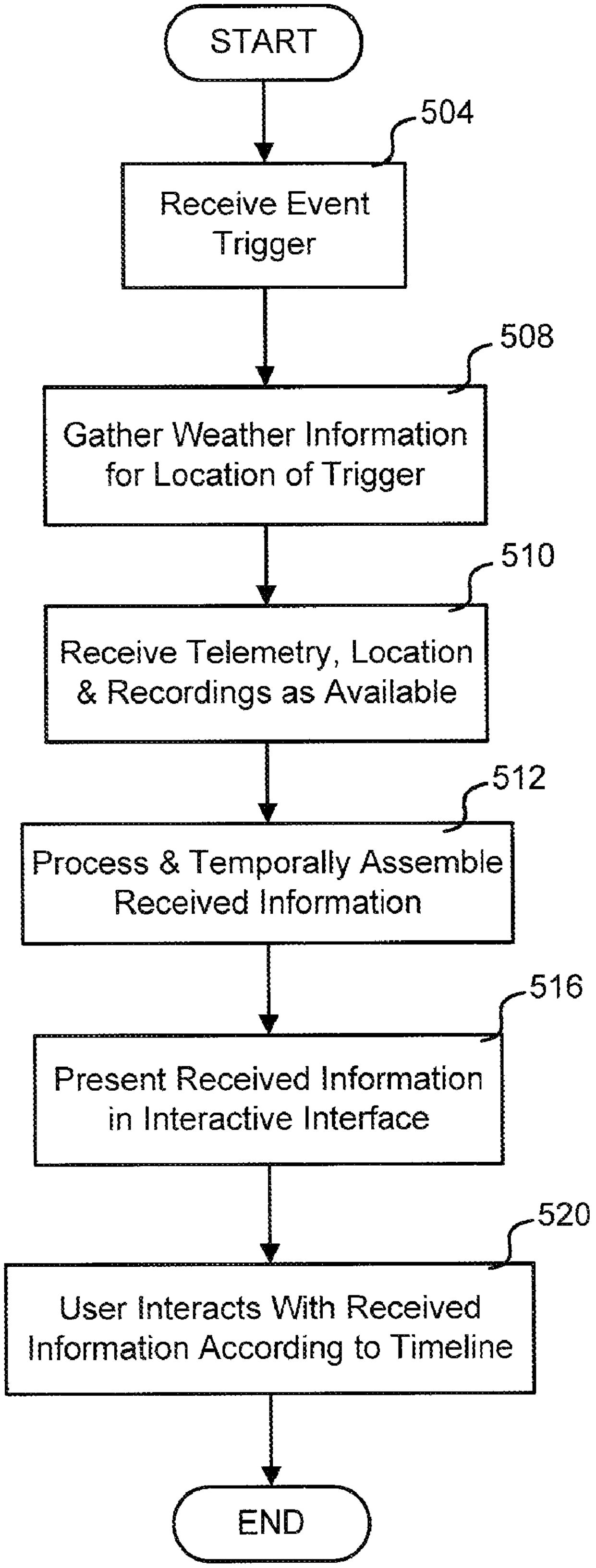
FIG. 5 illustrates a flowchart of an embodiment of a method for processing critical event information.

With reference to FIG. 5, a flowchart of an embodiment of a process 500 for processing critical event information is shown. The depicted portion of the process begins in clock 504 where an event trigger is received by the network management center 136. With the vehicle location at the trigger point, the localized weather information is gathered. The weather information for a period surrounding the critical event is found and stored along with anything else relevant to weather conditions (e.g., daylight levels, satellite imagery, radar readings, etc.)

In block 510 and throughout the process 500, information sent from the vehicle 128 is gathered and potentially stored. All the information surrounding a critical event is processed and temporally assembled in block 512. Information is arranged according to a common timescale. Block 516 presents the received information in any customized manner to the end user. Through interaction with the CE interface 140, the end user can investigate the time surrounding the event trigger.

Figure 6:
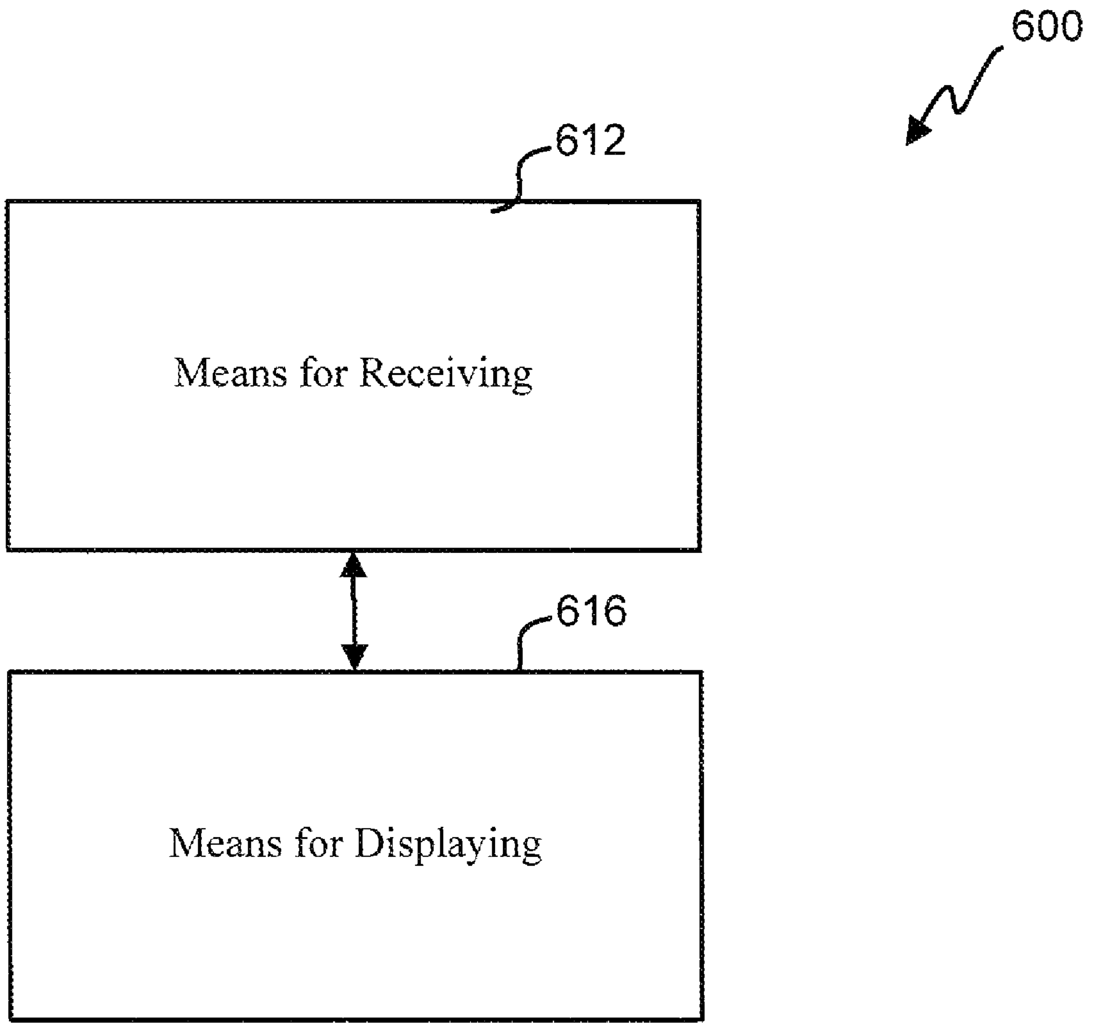
FIG. 6 illustrates a block diagram of an embodiment of a communication system.

Referring next to FIG. 6, a block diagram of an embodiment of a fleet management apparatus 600 for monitoring a vehicle remotely is shown. The vehicle management apparatus includes means for receiving information from the vehicle 612 (e.g., a wireless or satellite modem, a network connection, or wired connection) and means for presenting 616 (e.g., a display, a projector, a touch screen) configured to simultaneously display a planned route and a driven route. The information is received wirelessly by the means for receiving, and the information comprises a location for the vehicle. The planned route is determined for the vehicle before travel of the driven route, and the driven route is determined from the information from the vehicle.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other mediums capable of storing, containing or carrying instruction(s) and/or data.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

Implementation of the techniques described above may be done in various ways. For example, these techniques may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

For a software implementation, the techniques, processes and functions described herein may be implemented with modules (e.g., procedures, functions, and so on) that perform the functions described herein. The software codes may be stored in memory units and executed by processors. The memory unit may be implemented within the processor or external to the processor, in which case the memory unit can be communicatively coupled to the processor using various known techniques.

While the principles of the disclosure have been described above in connection with specific apparatuses and methods, it is to be clearly understood that this description is made only by way of example and not as limitation on the scope of the disclosure.

The invention claimed is:

1. A method for monitoring a remotely located vehicle, comprising:

determining that an event has been triggered at a time t; and displaying, on a display, a set of information related to the remotely located vehicle for times t and, either t plus a time period after the event or t minus a time period before the event, wherein the set of information comprises:

hours of service for a user of the remotely located vehicle, one or more portions of a planned route for the remotely located vehicle, and one or more portions of a traveled route of the remotely located vehicle based on location information received from the remotely located vehicle.

2. The method of claim 1, wherein the set of information further comprises:

telemetry data related to the remotely located vehicle for times t and, either t plus a time period after the event or t minus a time period before the event, wherein the telemetry data is at least one of the data selected from, weather data for a location of the remotely located vehicle, a video clip captured at the remotely located vehicle, or an audio clip captured at the remotely located vehicle.

3. The method of claim 2, wherein the telemetry data is displayed relative to time.

4. The method of claim 1, wherein the set of information is displayed relative to time.

5. The method of claim 1, further comprising:

displaying the triggered event.

6. An apparatus for monitoring a remotely located vehicle, comprising:

a controller configured to determine that an event has been triggered at a time t; and a display coupled to the controller and configured to:

display a set of information related to the remotely located vehicle for times t and, either t plus a time period after the event or t minus a time period before the event, wherein the set of information comprises:

hours of service for a user of the remotely located vehicle, one or more portions of a planned route for the remotely located vehicle, and one or more portions of a traveled route of the remotely located vehicle based on location information received from the remotely located vehicle.

7. The apparatus of claim 6, wherein the set of information further comprises:

telemetry data related to the remotely located vehicle for times t and, either t plus a time period after the event or t minus a time period before the event, wherein the telemetry data is at least one of the data selected from, weather data for a location of the remotely located vehicle, a video clip captured at the remotely located vehicle, or an audio clip captured at the remotely located vehicle.

8. The apparatus of claim 6, wherein the telemetry data is displayed relative to time.

9. The apparatus of claim 6, wherein the set of information is displayed relative to time.

10. The apparatus of claim 6, wherein the display is further configured to display the triggered event.

11. An apparatus for monitoring a remotely located vehicle, comprising:

means for determining that an event has been triggered at a time t; and means for displaying, on a display, a set of information related to the remotely located vehicle for times t and, either t plus a time period after the event or t minus a time period before the event, wherein the set of information comprises:

hours of service for a user of the remotely located vehicle, one or more portions of a planned route for the remotely located vehicle, and one or more portions of a traveled route of the remotely located vehicle based on location information received from the remotely located vehicle.

12. The apparatus of claim 11, wherein the set of information further comprises:

telemetry data related to the remotely located vehicle for times t and, either t plus a time period after the event or t minus a time period before the event, wherein the telemetry data is at least one of the data selected from, weather data for a location of the remotely located vehicle, a video clip captured at the remotely located vehicle, or an audio clip captured at the remotely located vehicle.

13. The apparatus of claim 11, wherein the telemetry data is displayed relative to time.

14. The apparatus of claim 11, wherein the set of information is displayed relative to time.

15. The apparatus of claim 11, further comprising:

means for displaying the triggered event.

16. A non-transitory machine readable medium having machine executable instructions encoded thereon to monitor a remotely located vehicle, the machine executable instructions causing a machine to perform a method comprising:

determining that an event has been triggered at a time t; and displaying, on a display, a set of information related to the remotely located vehicle for times t and, either t plus a time period after the event or t minus a time period before the event, wherein the set of information comprises:

hours of service for a user of the remotely located vehicle, one or more portions of a planned route for the remotely located vehicle, and one or more portions of a traveled route of the remotely located vehicle based on location information received from the remotely located vehicle.

17. The non-transitory machine readable medium of claim 16, wherein the set of information further comprises:

telemetry data related to the remotely located vehicle for times t and, either t plus a time period after the event or t minus a time period before the event, wherein the telemetry data is at least one of the data selected from, weather data for a location of the remotely located vehicle, a video clip captured at the remotely located vehicle, or an audio clip captured at the remotely located vehicle.

18. The non-transitory machine readable medium of claim 16, wherein the telemetry data is displayed relative to time.

19. The non-transitory machine readable medium of claim 16, wherein the set of information is displayed relative to time.

20. The non-transitory machine readable medium of claim 16, further comprising:

displaying the triggered event.

* * * * *